US011241802B2

(12) United States Patent
Douglas et al.

(10) Patent No.: US 11,241,802 B2
(45) Date of Patent: Feb. 8, 2022

(54) DUAL-MATERIAL VACUUM CUP FOR A VACUUM-BASED END EFFECTOR

(71) Applicant: Material Handling Systems, Inc., Mt. Washington, KY (US)

(72) Inventors: Josiah Douglas, Louisville, KY (US); Derek Robert Sturm, Louisville, KY (US); David W. Caldwell, II, Louisville, KY (US)

(73) Assignee: Material Handling Systems, Inc., Mt. Washington, KY (US)

( * ) Notice: Subject to any disclaimer, the term of this patent is extended or adjusted under 35 U.S.C. 154(b) by 9 days.

(21) Appl. No.: 16/793,058

(22) Filed: Feb. 18, 2020

(65) Prior Publication Data

US 2020/0262087 A1 Aug. 20, 2020

Related U.S. Application Data

(60) Provisional application No. 62/807,136, filed on Feb. 18, 2019.

(51) Int. Cl.
*B25J 15/06* (2006.01)
*B25J 15/00* (2006.01)

(52) U.S. Cl.
CPC ....... *B25J 15/0691* (2013.01); *B25J 15/0057* (2013.01); *B25J 15/0683* (2013.01)

(58) Field of Classification Search
CPC ................ B25J 15/0616; B25J 15/0683; B25J 15/0691; B25J 15/0052; B25J 15/0057;
(Continued)

(56) References Cited

U.S. PATENT DOCUMENTS 3,005,652 A 10/1961 Helm
3,154,306 A 10/1964 Elliott et al.
(Continued)

FOREIGN PATENT DOCUMENTS

CN 201214247 Y 4/2009
FR 2756264 A1 5/1998
(Continued)

OTHER PUBLICATIONS

Korean Intellectual Property Office, International Search Report and Written Opinion issued in corresponding Application No. PCT/US2020/018551, dated Jun. 12, 2020.
(Continued)

*Primary Examiner* — Dean J Kramer
(74) *Attorney, Agent, or Firm* — Stites & Harbison, PLLC; David W. Nagle, Jr.; Gary N. Stewart

(57) ABSTRACT

A dual-material vacuum cup for a vacuum-based end effector includes a bellows having a proximal end configured for connection to the end effector and a distal end. The bellows also defines a pathway for a flow of air. A lip is connected to the distal end of the bellows, the lip defining an opening in fluid communication with the pathway for the flow of air. An insert is then connected to a distal end of the lip, and the insert is in fluid communication with the opening defined by the lip. To engage parcels of various dimension and construction, the lip is composed of a first material (such as silicone rubber or another elastomeric material), while the insert is comprised of a second material (such as a foam material).

18 Claims, 4 Drawing Sheets

(58) Field of Classification Search
CPC ... B66C 1/0206; B66C 1/0212; B66C 1/0231; B66C 1/0243; Y10S 901/40; B65G 47/918
USPC .................................................. 294/188, 189
See application file for complete search history.

(56) References Cited

U.S. PATENT DOCUMENTS

| | | | | |
|---|---|---|---|---|
| 4,078,671 | A * | 3/1978 | Lundstrom | B25J 15/00 294/183 |
| 4,561,687 | A * | 12/1985 | Bostrom | B66C 1/0212 198/689.1 |
| 4,787,812 | A * | 11/1988 | Gopfert | B66C 1/0212 414/737 |
| 7,726,715 | B2 | 6/2010 | Nagasawa et al. | |
| 8,534,633 | B2 * | 9/2013 | Tell | B66C 1/0231 248/363 |
| 9,399,297 | B2 * | 7/2016 | Cho | F16B 47/00 |
| 10,646,898 | B2 | 5/2020 | Hillerich, Jr. et al. | |
| 2010/0244344 | A1 * | 9/2010 | Mougin | B65B 23/08 269/21 |
| 2017/0087718 | A1 * | 3/2017 | Wagner | B25J 15/0616 |
| 2019/0240813 | A1 * | 8/2019 | Nakayama | B25J 15/0683 |

FOREIGN PATENT DOCUMENTS

| | | |
|---|---|---|
| JP | 2016-533988 A | 11/2016 |
| JP | 2018-089732 A | 6/2018 |
| KR | 20-2016-0002650 U | 7/2016 |

OTHER PUBLICATIONS

Office Action, U.S. Appl. No. 16/876,263 (dated Jun. 29, 2021).

* cited by examiner

DUAL-MATERIAL VACUUM CUP FOR A VACUUM-BASED END EFFECTOR

CROSS-REFERENCE TO RELATED APPLICATIONS

The present application claims priority to U.S. Patent Application Ser. No. 62/807,136 filed on Feb. 18, 2019, the entire disclosure of which is incorporated herein by reference.

BACKGROUND OF THE INVENTION

The present invention relates to vacuum-based end effectors that are used to engage parcels within a sorting or similar facility.

In a sorting facility for parcels, various parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the various parcels within the facility.

One such piece of equipment is an end effector, which can be attached to a robot and maneuvered to grasp or engage the parcels that are placed on the conveyers of the systems. In this regard, a number of different systems utilizing different end effectors exist in the art. For example, one such system is described in U.S. Patent Application Publication No. 2018/0345324, which is incorporated herein by reference, in which an end effector with a number of vacuum cups is attached to a robot for engaging parcels. However, as the parcels moving through a given sorting facility have a number of different shapes and sizes and are in packaging ranging from rigid cardboard boxes to flexible plastic ("poly") bags or other flexible materials, current end effectors are generally not capable of or are not readily configured to effectively and adequately grasp or engage each and every type of parcel. For example, vacuum-based end effectors of known construction may be unable to sufficiently grasp flexible plastic ("poly") bags or similar parcels in flexible packaging materials that may have a wrinkled or non-uniform surface.

SUMMARY OF THE INVENTION

The present invention is a dual-material vacuum cup for vacuum-based end effectors that are used to engage parcels within a sorting or similar facility.

A dual-material vacuum cup for a vacuum-based end effector includes a bellows, a lip, and an insert. The bellows has a proximal end configured for connection to a vacuum-based end effector, where it is placed in fluid communication with a vacuum source. The bellows also has a distal end to which the lip is connected. The bellows defines a pathway along which a flow of air can travel, and the lip defines an opening in fluid communication with the pathway, such that air drawn through the opening defined by the lip subsequently travels through the bellows. The insert is connected to a distal end of the lip and is in fluid communication with the opening defined by the lip, so that air drawn through the insert subsequently passes through the opening and through the bellows. Thus, the vacuum cup can be placed in fluid communication with a vacuum source to provide a suction force which enables the vacuum cup to effectively grasp a target parcel.

To better enable the vacuum cup to engage parcels of various sizes and shapes and made of various materials, the lip is composed of a first material, and the insert is composed of a second material. In some embodiments, the lip is composed of an elastomeric material, such as silicone rubber, while the insert is composed of a foam material, such as a polyethylene or a polyurethane foam.

DETAILED DESCRIPTION OF THE INVENTION

The present invention is a dual-material vacuum cup for vacuum-based end effectors that are used to engage parcels within a sorting or similar facility.

Figure 1:
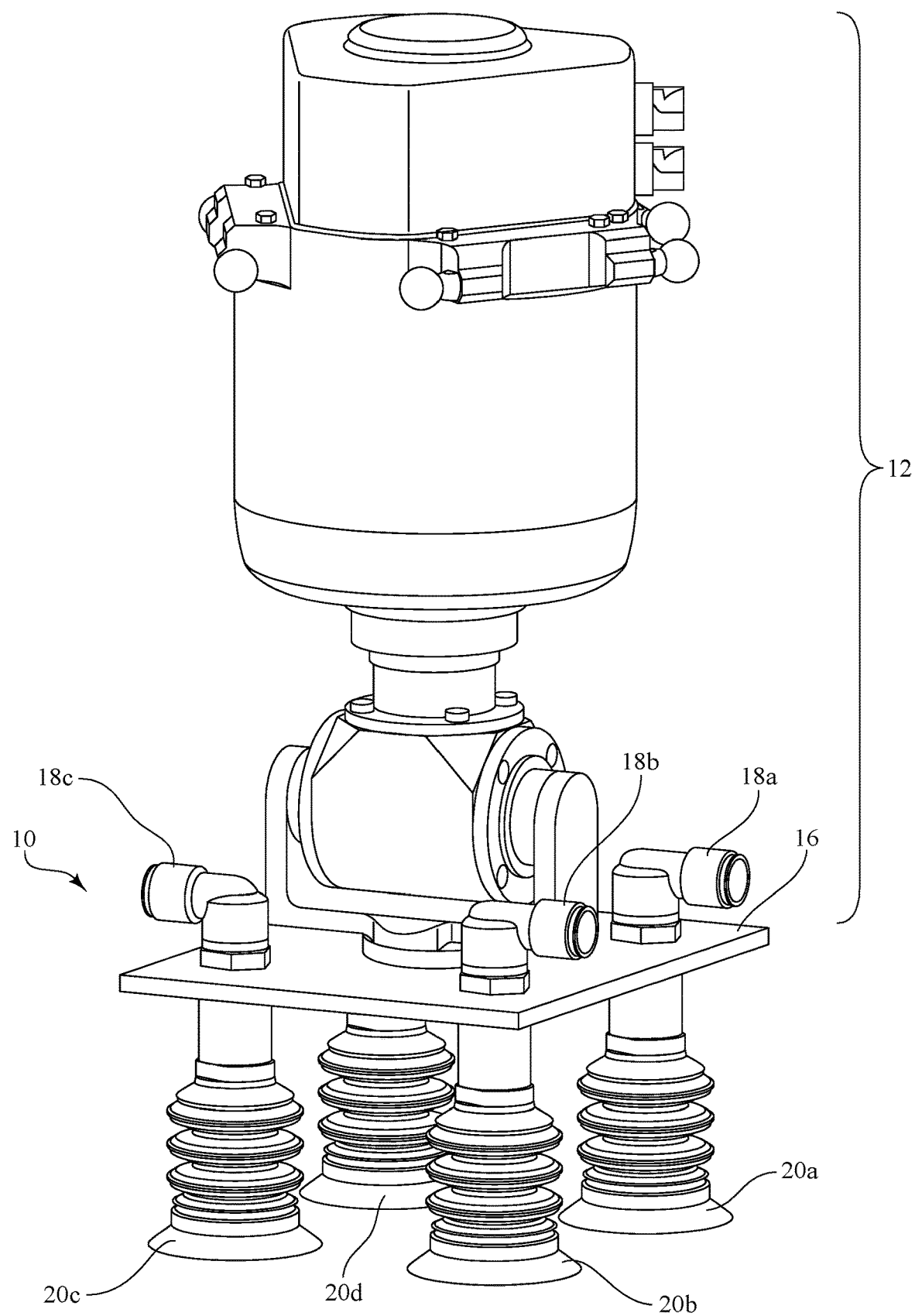
FIG. 1 is a perspective view of a vacuum-based end effector for engaging parcels including exemplary dual-material vacuum cups made in accordance with the present invention attached to a portion of a robot.

FIG. 1 is a perspective view of a vacuum-based end effector 10 for engaging parcels, including exemplary dual-material vacuum cups 20*a*, 20*b*, 20*c*, 20*d* made in accordance with the present invention, which is mounted to a portion of a robot 12. It should be appreciated that the portion of a robot 12 shown may be a component, such as a robotic arm, of a larger robot or robotic system, which is configured to move the end effector 10 toward a target parcel. For example, the portion of the robot 12 may be a component of a Delta P6 robot manufactured by Schneider Electric and available, for instance, from Advantage Industrial Automation of Duluth, Ga.

Referring still to FIG. 1, the end effector 10 includes a base plate 16 to which multiple vacuum cups 20*a*, 20*b*, 20*c*, 20*d* are mounted. In this particular embodiment, the end effector 10 includes four vacuum cups 20*a*, 20*b*, 20*c*, 20*d*: a first vacuum cup 20*a*; a second vacuum cup 20*b*; a third vacuum cup 20*c*; and a fourth vacuum cup 20*d*. Each vacuum cup 20*a*, 20*b*, 20*c*, 20*d* is configured to grasp or engage parcels that are of various sizes and shapes and that are made of various materials. To this end, each vacuum cup 20*a*, 20*b*, 20*c*, 20*d* of the end effector 10 includes all of the components and features as described below with reference to FIGS. 2-4.

Referring still to FIG. 1, the end effector 10 further includes multiple connectors 18*a*, 18*b*, 18*c* (only three of which are visible in FIG. 1), each corresponding to one of the vacuum cups 20*a*, 20*b*, 20*c*, 20*d*. In this particular embodiment, the end effector 10 thus includes four connectors 18*a*, 18*b*, 18*c*: a first connector 18*a* corresponding to the first vacuum cup 20*a*; a second connector 18*b* corresponding to the second vacuum cup 20*b*; a third connector 18*c* corresponding to the third vacuum up 20*c*; and a fourth connector (not shown) corresponding to the fourth vacuum cup 20*d*. Each connector 18*a*, 18*b*, 18*c* is in fluid communication with the vacuum cup 20*a*, 20*b*, 20*c*, 20*d* to which it corresponds and is also in fluid communication with a vacuum source (not shown) via a vacuum hose (not shown) to provide suction to the vacuum cup 20*a*, 20*b*, 20*c*, 20*d* to which it corresponds. In this way, the connectors 18a, 18b, 18c can be selectively connected to or disconnected from a vacuum source to independently turn on or off, and thus individually address, the vacuum cups 20a, 20b, 20c, 20d. In this exemplary embodiment, the base plate 16 defines multiple openings through which the respective connectors 18a, 18b, 18c extend to connect to each vacuum cup 20a, 20b, 20c, 20d. In other words, in this particular embodiment, each connector 18a, 18b, 18c includes: a proximal end that is connected to and is in fluid communication with the vacuum source (not shown), a central portion which passes through one of the multiple openings defined by the base plate 16, and a distal end that is connected to and in fluid communication with one of the multiple vacuum cups 20a, 20b, 20c, 20d.

In use, the portion of the robot 12 can be manipulated to reposition and lower the end effector 10 toward a target parcel, such that one or more of the vacuum cups 20a, 20b, 20c, 20d engage the surface of the parcel. The vacuum cups 20a, 20b, 20c, 20d engaging the surface of the parcel can be selectively connected to (or placed in fluid communication with) the vacuum source, as described above, to provide a suction force sufficient to grasp and hold the parcel against the vacuum cups 20a, 20b, 20c, 20d as the portion of the robot 12 lifts and subsequently transports the parcel to an intended destination. Upon reaching the intended destination, the vacuum cups 20a, 20b, 20c, 20d engaging the parcel can be disconnected from the vacuum source to release the parcel.

Figure 2:
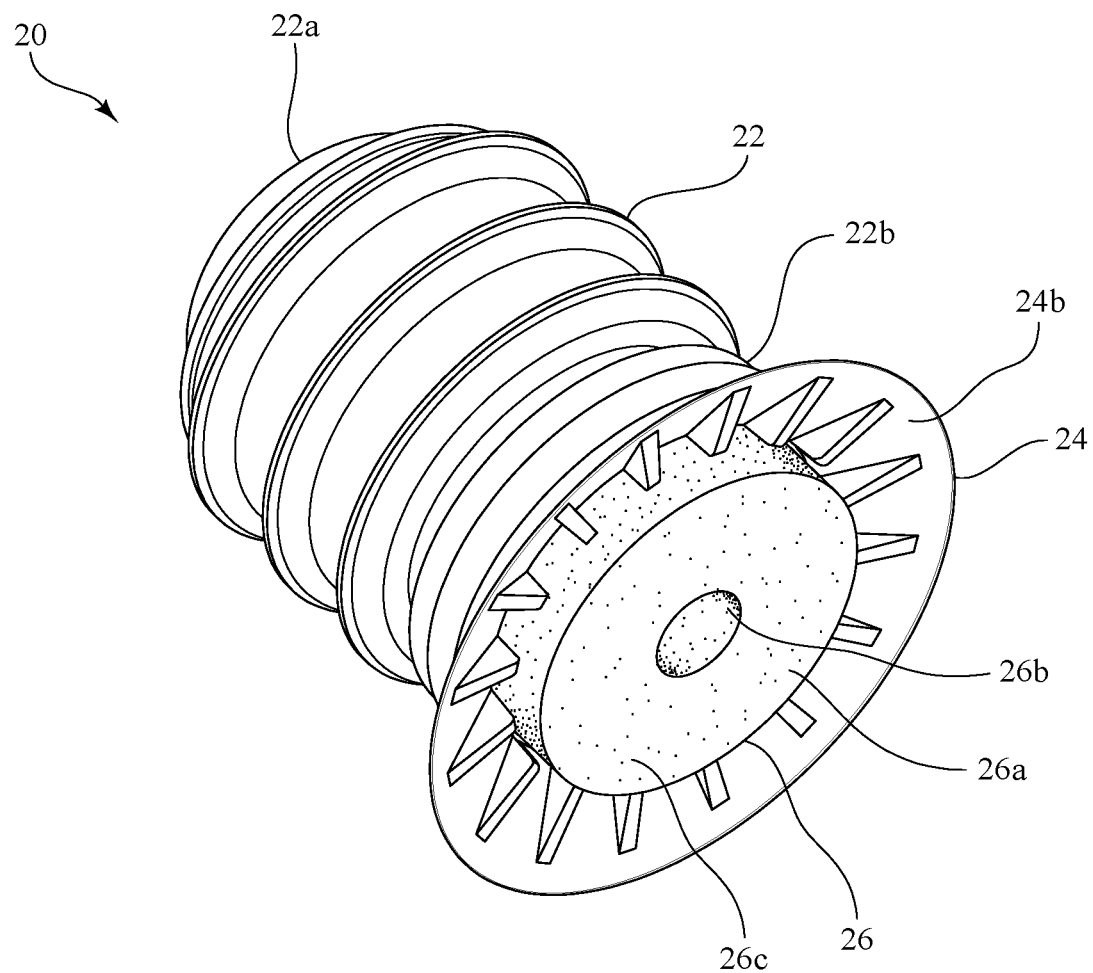
FIG. 2 is a perspective view of an exemplary dual-material vacuum cup made in accordance with the present invention.
Figure 3:
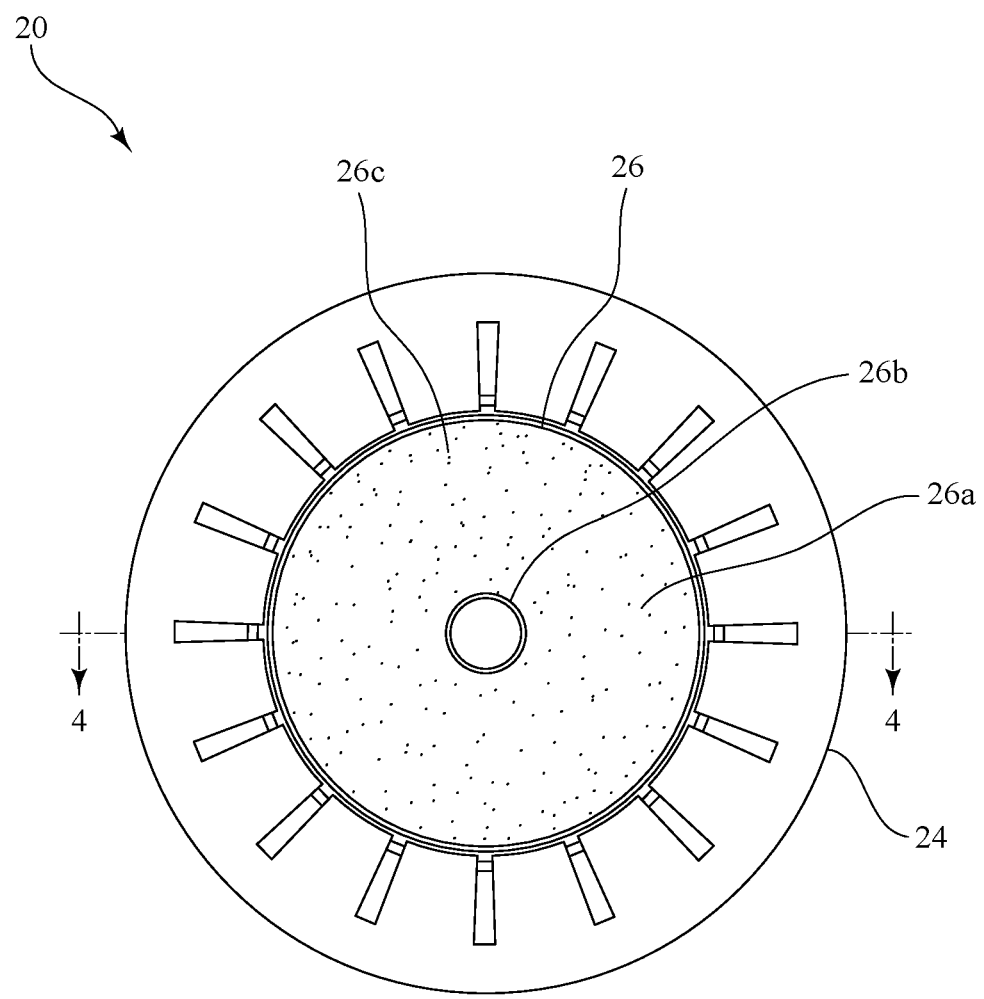
FIG. 3 is a bottom plan view of the exemplary dual-material vacuum cup of FIG. 2.
Figure 4:
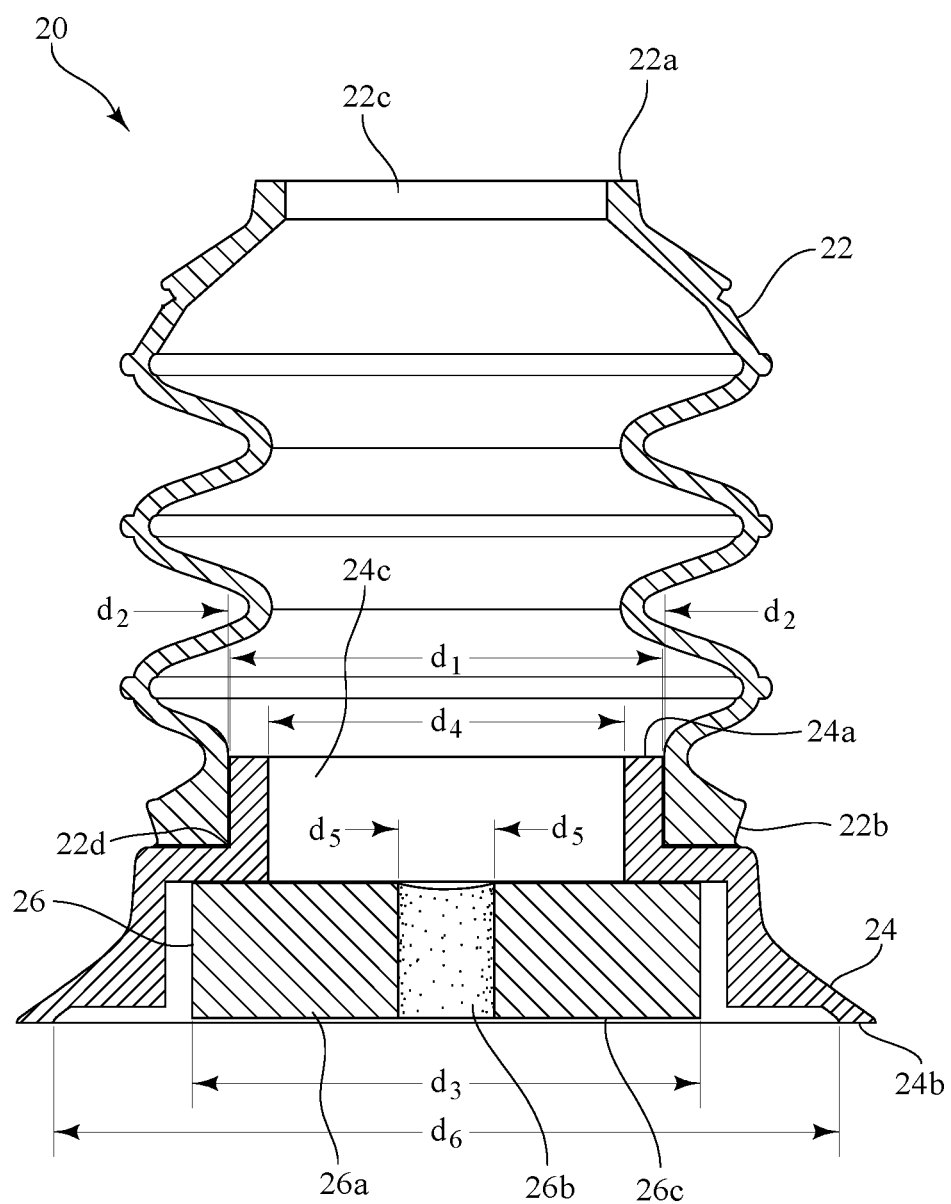
FIG. 4 is a sectional view of the exemplary dual-material vacuum cup of FIG. 2 taken along line 4-4 of FIG. 3.

FIGS. 2-4 are various views of an exemplary dual-material vacuum cup 20 made in accordance with the present invention. As shown in FIGS. 2-4, the vacuum cup 20 includes a bellows 22 having a proximal end 22a configured for connection to the end effector 10 and a distal end 22b that is connected to a lip 24 of the vacuum cup 20 (as further described below).

As shown best in FIG. 4, in this exemplary embodiment, the proximal end 22a of the bellows 22 defines an opening (or outlet) 22c configured to receive the distal end of a connector (such as the connectors 18a, 18b, 18c described above with respect to FIG. 1) to place the vacuum cup 20 in fluid communication with a vacuum source.

Referring still to FIG. 4, the distal end 22b of the bellows defines an opening (or inlet) 22d in which a proximal end 24a of the lip 24 can be inserted and joined (for example, using an adhesive) to connect the two components of the vacuum cup 20, as further discussed below. In this regard, in this exemplary embodiment, to facilitate insertion of the proximal end 24a of the lip 24 into the inlet 22d of the bellows 22, the proximal end 24a of the lip 24 has a diameter, $d_1$, which is substantially equal to the diameter, $d_2$, of the inlet 22d of the bellows 22. It should be appreciated, however, that, in alternative embodiments, the bellows and 22 and the lip 24 could be integrally formed as to define a single component and still permit the vacuum cup 20 to function as intended. In such embodiments, the portion of the integrally formed component defining the bellows 22 is preferably comprised of one material and the portion defining the lip 24 is comprised of another material that is softer than the material used for the bellows 22.

Referring still to FIG. 4, the inlet 22d also permits a flow of air to enter the interior of the bellows 22 as a vacuum is drawn through the vacuum cup 20. To permit air entering the inlet 22d to flow through the bellows 22 and subsequently exit through the outlet 22c, the interior of the bellows 22 is substantially hollow. Thus, the inlet 22d, hollow interior, and outlet 22c of the bellows 22 effectively define a pathway along which a flow of air can travel entirely through the bellows 22. The bellows 22 is preferably constructed of a pliable material, which enables the bellows 22 to deform in response to the application of pressure to permit the vacuum cup 20 to sufficiently engage a target parcel even if the lip-end plane of the vacuum cup 20 is misaligned with the surface plane of the target parcel upon initial contact. For example, in certain embodiments, the bellows 22 is constructed of a molded thermoplastic, such as polyurethane.

Referring still to FIG. 4, as described above, the proximal end 24a of the lip 24 is inserted into and joined with the distal end 22b of the bellows. The lip 24 also has a distal end 24b for engaging parcels. In this regard, the lip 24 defines an opening 24c that is in fluid communication with the pathway defined by the bellows 22. The lip 24 is composed of an elastomeric material, such as silicone rubber. Without wishing to be bound by any particular theory, it is believed that, while versatile, such elastomeric material is particularly suited for engaging parcels including dull or glossy paper-based materials, such as rigid cardboard, as such material permits the lip 24 to seal against the surface of such parcels.

Referring again to FIGS. 2-4, the dual-material vacuum cup 20 further includes an insert 26 connected to the distal end 24b of the lip 24. The insert 26 is in fluid communication with the opening 24c defined by the lip 24, so that air drawn through the lip 24 subsequently passes through the opening 24c defined by the lip 24 and into the bellows 22. To this end, the insert 26 defines a central channel 26b and includes an annular porous portion 26a that surrounds the central channel 26b, with the central channel 26b and the annular porous portion 26a both allowing air to pass through (but at different flow rates). Specifically, the porous portion 26a has sufficient porosity to allow air to travel through it to apply a vacuum when the vacuum cup 20 is placed in fluid communication with the vacuum source and engages a parcel. The central channel 26b extends entirely through the insert 26 to permit air to flow through the insert 26 generally unimpeded. As perhaps shown best in FIG. 4, in this exemplary embodiment, the insert 26 is composed entirely of a foam material, such as a polyethylene or a polyurethane foam, which is more compliant than the elastomeric material from which the lip 24 is constructed. Furthermore, in this exemplary embodiment, the insert 26 is composed of a foam material with a porosity of approximately 30%. In other words, the foam material is more readily deformed in response to the application of pressure than the elastomeric material from which the lip 24 is constructed. Without wishing to be bound by any particular theory, it is believed that the insert 26 composed of a foam material is particularly useful in engaging the flexible packaging materials of parcels, such as plastic ("poly") bags, that may include a wrinkled or non-uniform surface. In this particular embodiment, the insert 26 has a generally cylindrical shape and defines a distal surface 26c that is essentially aligned with an outer edge defined by the distal end 24b of the lip 24, as shown best in FIG. 4. Of course, the shape of the insert 26 and its positioning relative to the outer edge defined by the distal end 24b of the lip 24 may vary and still permit the vacuum cup 20 to operate as intended.

Referring again to FIG. 4, to ensure an adequate suction force is applied through the insert 26 when the vacuum cup 20 is placed in fluid communication with the vacuum source, the insert 26 is connected to the distal end 24b of the lip 24, such that the insert 26 substantially covers the opening 24c defined by the lip 24. To this end, the diameter, $d_3$, of the insert 26 is greater than the diameter, $d_4$, of the opening 24c defined by the lip 24. Additionally, to ensure that air is drawn through both the porous portion 26a and the central channel 26b of the inset 26 when the vacuum cup 20 engages a parcel, the diameter, $d_4$, of the opening 24c defined by the lip 24 is greater than the diameter, $d_5$, of the central channel 26b defined by the insert 26. The diameter, $d_5$, of the central channel 26b is, however, of sufficient diameter as to permit a portion of the flexible packaging material of a parcel to be drawn therein. Furthermore, to this end, the insert 26 is centrally positioned at the distal end 24b of the lip 24, so that the opening 24c defined by the lip 24 and the central channel 26b of the insert 26 are aligned. The diameter, $d_6$, of the distal end 24b of the lip 24 is also greater than the diameter, $d_3$, of the insert 26, so that both the distal end 24b of the lip 24 and the insert 26 contact the surface of a parcel when the end effector 10 positioned to engage the parcel.

With respect to FIG. 4, and solely for purposes of example, in one exemplary embodiment, the identified diameters of the various components are as follows:

TABLE A

| | |
|---|---|
| $d_1$ | 50 mm |
| $d_2$ | 50 mm |
| $d_3$ | 70 mm |
| $d_4$ | 45 mm |
| $d_5$ | 44 mm |
| $d_6$ | 80 mm |

One of ordinary skill in the art will recognize that additional embodiments are also possible without departing from the teachings of the present invention. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A dual-material vacuum cup for an end effector configured for placement in fluid communication with a vacuum source, comprising:
   a bellows having a proximal end configured for connection to the end effector and a distal end, the bellows defining a pathway for a flow of air;
   a lip of a first material connected to the distal end of the bellows, the lip defining an opening in fluid communication with the pathway for the flow of air; and
   an insert of a second material connected to a distal end of the lip;
   wherein the insert is composed entirely of a porous foam material, which is more compliant than the first material;
   wherein the insert defines a central channel extending entirely through the insert, such that the insert can be characterized as including an annular portion that surrounds the central channel; and
   wherein the insert is in fluid communication with the opening defined by the lip, such that, in use, the flow of air is drawn through both the annular portion and the central channel defined by the insert.

2. The dual-material vacuum cup as recited in claim 1, wherein the lip is composed of an elastomeric material.

3. The dual-material vacuum cup as recited in claim 1, wherein a diameter of the opening defined by the lip is greater than a diameter of the central channel defined by the insert.

4. The dual-material vacuum cup as recited in claim 3, wherein a diameter of the lip is greater than a diameter of the insert, and wherein the diameter of the insert is greater than the diameter of the opening defined by the lip.

5. The dual-material vacuum cup as recited in claim 4, wherein the insert is centrally positioned at the distal end of the lip.

6. The dual-material vacuum cup as recited in claim 1, wherein a distal surface defined by the insert is essentially aligned with an outer edge defined by the distal end of the lip.

7. The dual-material vacuum cup as recited in claim 1, wherein the lip is directly connected to the bellows and the insert is directly connected to the lip, such that the lip separates the insert from the bellows.

8. The dual-material vacuum cup as recited in claim 1, wherein the lip is adhered to the bellows.

9. The dual-material vacuum cup as recited in claim 1, wherein an uppermost surface of the insert is positioned below the distal end of the bellows.

10. An end effector for engaging parcels and configured for mounting to a robot, comprising:
    a base plate; and
    one or more vacuum cups mounted to the base plate, with each of the one or more vacuum cups including
       a bellows having a proximal end configured for connection to the end effector and a distal end, the bellows defining a pathway for a flow of air,
       a lip of a first material connected to the distal end of the bellows, the lip defining an opening in fluid communication with the pathway for the flow of air, and
       an insert of a second material connected to a distal end of the lip,
       wherein the insert is composed entirely of a porous foam material, which is more compliant than the first material,
       wherein the insert defines a central channel extending entirely through the insert, such that the insert can be characterized as including an annular portion that surrounds the central channel, and
       wherein the insert is in fluid communication with the opening defined by the lip, such that, in use, the flow of air is drawn through both the annular portion and the central channel defined by the insert.

11. The end effector for engaging parcels as recited in claim 10, wherein the lip of each of the one or more vacuum cups is composed of an elastomeric material.

12. The end effector for engaging parcels as recited in claim 10, wherein a diameter of the opening defined by the lip of each of the one or more vacuum cups is greater than a diameter of the central channel defined by the insert.

13. The end effector for engaging parcels as recited in claim 12, wherein a diameter of the lip of each of the one or more vacuum cups is greater than a diameter of the insert, and wherein the diameter of the insert is greater than the diameter of the opening defined by the lip.

14. The end effector for engaging parcels as recited in claim 13, wherein the insert of each of the one or more vacuum cups is centrally positioned at the distal end of the lip.

15. The end effector for engaging parcels as recited in claim 10, wherein the insert of each of the one or more vacuum cups is centrally positioned at the distal end of the lip.

16. The end effector for engaging parcels as recited in claim 10, wherein the lip of each of the one or more vacuum cups is directly connected to the bellows and the insert of each of the one or more vacuum cups is directly connected to the lip, such that the lip separates the insert from the bellows.

17. The end effector for engaging parcels as recited in claim 10, wherein the lip of each of the one or more vacuum cups is adhered to the bellows.

18. The end effector for engaging parcels as recited in claim 10, wherein an uppermost surface of the insert of each of the one or more vacuum cups is positioned below the distal end of the bellows.

* * * * *